(12) United States Patent
Robinson et al.

(10) Patent No.: US 7,616,841 B2
(45) Date of Patent: *Nov. 10, 2009

(54) END-TO-END DESIGN OF ELECTRO-OPTIC IMAGING SYSTEMS

(75) Inventors: M. Dirk Robinson, Menlo Park, CA (US); David G Stork, Portola Valley, CA (US)

(73) Assignee: Ricoh Co., Ltd., Tokyo (JP)

( * ) Notice: Subject to any disclaimer, the term of this patent is extended or adjusted under 35 U.S.C. 154(b) by 857 days.

This patent is subject to a terminal disclaimer.

(21) Appl. No.: 11/155,870

(22) Filed: Jun. 17, 2005

(65) Prior Publication Data

US 2006/0285002 A1 Dec. 21, 2006

(51) Int. Cl.
*G06K 7/00* (2006.01)
*G06K 9/40* (2006.01)
*H04N 5/225* (2006.01)

(52) U.S. Cl. .................. 382/312; 382/254; 348/335

(58) Field of Classification Search .......... 382/128, 382/254, 260, 274, 295, 305, 312, 317, 321; 348/335, 207.99

See application file for complete search history.

(56) References Cited

U.S. PATENT DOCUMENTS

| | | | |
|---|---|---|---|
| 5,227,890 A | 7/1993 | Dowski | |
| 5,521,695 A | 5/1996 | Cathey | |
| 5,715,483 A | 2/1998 | Omata et al. | |
| 5,748,371 A | 5/1998 | Cathey | |
| 5,870,179 A | 2/1999 | Cathey | |
| 6,021,005 A | 2/2000 | Cathey | |
| 6,069,738 A | 5/2000 | Cathey | |
| 6,437,925 B1 * | 8/2002 | Nishioka | 359/726 |
| 6,525,302 B2 | 2/2003 | Dowski | |
| 6,809,995 B2 * | 10/2004 | Kadlec et al. | 369/44.29 |
| 6,842,297 B2 | 1/2005 | Dowski | |
| 6,873,733 B2 | 3/2005 | Dowski | |
| 6,891,781 B2 * | 5/2005 | Kadlec et al. | 369/44.27 |
| 6,911,638 B2 | 6/2005 | Dowski | |
| 6,940,649 B2 | 9/2005 | Dowski | |

(Continued)

FOREIGN PATENT DOCUMENTS

EP  0814605 A2  12/1997

(Continued)

OTHER PUBLICATIONS

Fales, C.L. et al., "Imaging System Design for Improved Information Capacity," Applied Optics, Mar. 15, 1984, pp. 872-888, vol. 23, No. 6.

(Continued)

*Primary Examiner*—Kanji Patel
(74) *Attorney, Agent, or Firm*—Fenwick & West LLP

(57) ABSTRACT

A unified design strategy takes into account different subsystems within an overall electro-optic imaging system. In one implementation, the design methodology predicts end-to-end imaging performance using a spatial model for the source and models for the optical subsystem, the detector subsystem and the digital image processing subsystem. The optical subsystem and digital image processing subsystems are jointly designed taking into account the entire system. The intermediate image produced by the optical subsystem is not required to be high quality since, for example, the quality may be corrected by the digital image processing subsystem.

32 Claims, 7 Drawing Sheets

U.S. PATENT DOCUMENTS

| | | |
|---|---|---|
| 7,031,054 B2 | 4/2006 | Cathey, Jr. et al. |
| 7,106,510 B2 | 9/2006 | Dowski, Jr. |
| 7,115,849 B2 | 10/2006 | Dowski, Jr. et al. |
| 7,218,448 B1 | 5/2007 | Cathey, Jr. et al. |
| 7,260,251 B2* | 8/2007 | Dowski et al. .............. 382/128 |
| 7,379,613 B2* | 5/2008 | Dowski et al. .............. 382/255 |
| 2002/0118457 A1 | 8/2002 | Dowski |
| 2002/0195548 A1 | 12/2002 | Dowski |
| 2003/0057353 A1 | 3/2003 | Dowski |
| 2003/0169944 A1 | 9/2003 | Dowski |
| 2003/0173502 A1 | 9/2003 | Dowski |
| 2004/0145808 A1 | 7/2004 | Cathey |
| 2004/0190762 A1 | 9/2004 | Dowski |
| 2004/0228005 A1 | 11/2004 | Dowski |
| 2004/0257543 A1 | 12/2004 | Dowski |
| 2005/0088745 A1 | 4/2005 | Cathey |
| 2005/0117114 A1 | 6/2005 | Jiang |
| 2005/0197809 A1 | 9/2005 | Dowski |
| 2005/0264886 A1 | 12/2005 | Dowski |

FOREIGN PATENT DOCUMENTS

| | | |
|---|---|---|
| EP | 0998124 A2 | 5/2000 |
| WO | WO 2004/063989 A2 | 7/2004 |

OTHER PUBLICATIONS

Maeda, Peter Y., Peter B. Catrysse, and Brain A. Wandell, "Integrating lens design with digital camera simulation," 5678 *SPIE Proceedings SPIE Electronic Imaging*, San Jose, CA, Feb. 2005, pp. 48-58.

Cathey, W. Thomas and Edward R. Dowski, "New paradigm for imaging systems," *Applied Optics*, vol. 41, No. 29, Oct. 10, 2002, pp. 6080-6092.

European Search Report, EP06253130, Sep. 26, 2005, 7 pages.

* cited by examiner

END-TO-END DESIGN OF ELECTRO-OPTIC IMAGING SYSTEMS

BACKGROUND OF THE INVENTION

1. Field of the Invention

This invention relates generally to the design of electro-optic imaging systems, and more particularly, to the "end-to-end" design of these systems.

2. Description of the Related Art

Electro-optic imaging systems typically include an optical subsystem (e.g., a lens assembly), an electronic detector subsystem (e.g., CCD detector array) and a digital image processing subsystem (e.g., typically implemented in dedicated chips or software). Traditional methods for designing these systems generally involve two discrete stages. First, the optical subsystem is designed with the goal of forming a high quality intermediate optical image of the source (subject to cost, physical and other non-imaging constraints). Next, after the optical subsystem has been designed, the digital image processing subsystem is designed to compensate for remaining defects in the sampled intermediate optical image.

The two design stages typically occur with very little coordination between the optical designer and the image processing designer. The separation of these stages is a reflection of the significant differences between the fields of optics and image processing in their methods, tools, goals and constraints. For example, each field covers a large swath of potential applications but there typically is little overlap between the two fields other than the design of electro-optic imaging systems. The design of conventional microscopes, telescopes, eyeglasses, etc. typically does not consider any significant image processing. Likewise, areas of image processing such as compression, computer graphics, and image enhancement typically do not involve any significant optics. As a result, each field has evolved independent of the other and with its own unique terminology, best practices, and set of tools. In general, the familiarity required to master each of these domains hinders a unified perspective to designing electro-optic imaging systems. One important challenge to a unified perspective is the lack of a common language with which to describe the problems and approaches between the two distinct fields. One prominent example can be seen in the thinking about the fundamental conceptual elements associated with each field. Optical designers deal with rays of light and passive optical elements whereas image processers deal with bytes of information and active algorithms. The laws and constraints governing these two fundamental classes of entities differ in numerous ways.

One drawback to the traditional design approach is that synergies between the optical subsystem and the digital image processing subsystem may be overlooked. The optical designer creates the "best" optical subsystem without knowledge of the digital image processing subsystem. The image processer creates the "best" digital image processing subsystem without the ability to modify the previously designed optical subsystem. These subsystems are then "glued" together to form the electro-optic imaging system. The concatenation of two independently designed "best" subsystems may not yield the "best" overall system. There may be unwanted interactions between the two independently designed subsystems and potential synergies between the two subsystems may go unrealized.

Thus, there is a need for design approaches based on an end-to-end design of the electro-optic imaging system, especially where the entire electro-optical system is considered as a whole, and designed for optimized performance.

SUMMARY OF THE INVENTION

The present invention overcomes the limitations of the prior art by providing a unified design strategy that takes into account different subsystems within the overall electro-optic imaging system. In one implementation, the design methodology predicts end-to-end imaging performance using models for the source, the optical subsystem, the detector subsystem and the digital image processing subsystem. The optical subsystem is then designed taking into account these other subsystems. For example, the optical subsystem and the digital image processing subsystem may be designed jointly based on a post-processing performance metric that takes into account the effects of the image processing. Unlike in conventional approaches, the intermediate optical image produced by the optical subsystem is not required to be high image quality since, for example, the image may be subsequently improved by the digital image processing subsystem.

The design methodology views the combined electro-optic imaging system as a whole and attempts to optimize a set of design parameters for a desired output. In this way, this framework offers a unified perspective and language with which to evaluate the end-to-end performance of an electro-optic imaging system. In effect, such a method relaxes the traditional requirement that the intermediate optical image formed by the optical subsystem be high image quality, as measured by traditional optical figures of merit such as wavefront error or spot size.

In one implementation, the design approach includes modeling propagation through the electro-optic imaging system based on a spatial model of the source. The optical subsystem and the digital image processing subsystem are then jointly designed based directly on a post-processing performance metric, where the metric is calculated based on the modeled propagation. The optical subsystem may be designed based on optimizing the post-processing performance metric, for example, assuming that the image processing parameters are chosen to give a globally optimal performance. This is done without requiring that the optical subsystem form a high quality intermediate optical image of the source.

The specific implementations will depend on the particular application. For example, the spatial model of the source may be based on a luminance function of the source, the source may be modeled by a power spectral density function, and/or the source model may be derived from physical principles or from empirical data. The source model may also account for factors such as the nature of the source (e.g., a binary source for certain types of scanned documents) or variations in the source or its presentation (e.g., motion or uncertainty in position). Similarly, propagation through the optical subsystem and detector subsystem can be modeled in different ways. Ray tracing, the point spread function, the modulation transfer function and/or optical transfer function are common approaches for modeling the optical subsystem. The detector subsystem can be modeled by a spatial filter followed by sampling. If a linear systems approach is used, the optical subsystem and detector subsystem can be modeled using y=Hs+n, where y is the predicted image, s is an ideal sampled image of the source, H is a sampled point spread function accounting for both the optical subsystem and the detector subsystem, and n is noise.

Propagation through the digital image processing subsystem will depend in part on the design space (i.e., the type of digital image processing being implemented). For example, the design space can be limited to digital image processing subsystems that restore degradation caused by the point spread function of the optical subsystem and/or the detector subsystem. It can also be limited to linear techniques or certain classes of linear techniques. Linear techniques are more likely to have a closed form solution or other solutions that are well behaved and that can be calculated in an efficient manner. However, the invention is not limited to just linear techniques.

The post-processing performance metric will also vary by application. A preferred digital image performance metric is the mean square error between an ideal image of the source and the image produced by propagation of the source through the electro-optic imaging system. For applications where the end goal is some sort of recognition (e.g., character recognition or bar code reading), the post-processing performance metric may be a measure of the accuracy of recognition, for example the error rate, rate of false positives, etc.

One advantage of this approach is that the resulting electro-optic imaging system may achieve the same system performance as a traditionally designed system, but possibly with fewer components, smaller "footprint" (spatial extent), lower cost, faster development time or less sensitivity (e.g., to manufacturing or environmental variations). This is because the intermediate optical image is no longer required to be of high image quality, thus opening up new areas in the design space. In these designs, the overall system performance may be the same or better than that of a traditionally designed system, even though the optical subsystem may form an intermediate optical image that is significantly worse in image quality than that formed by the traditionally designed optical subsystem. In these designs, the optical subsystem may introduce significant aberrations in the intermediate optical image so long as these are adequately corrected by the digital image processing subsystem.

Other aspects of the invention include software and tools to implement the design methods described above, and devices, systems and subsystems created by this design approach.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Figure 1:
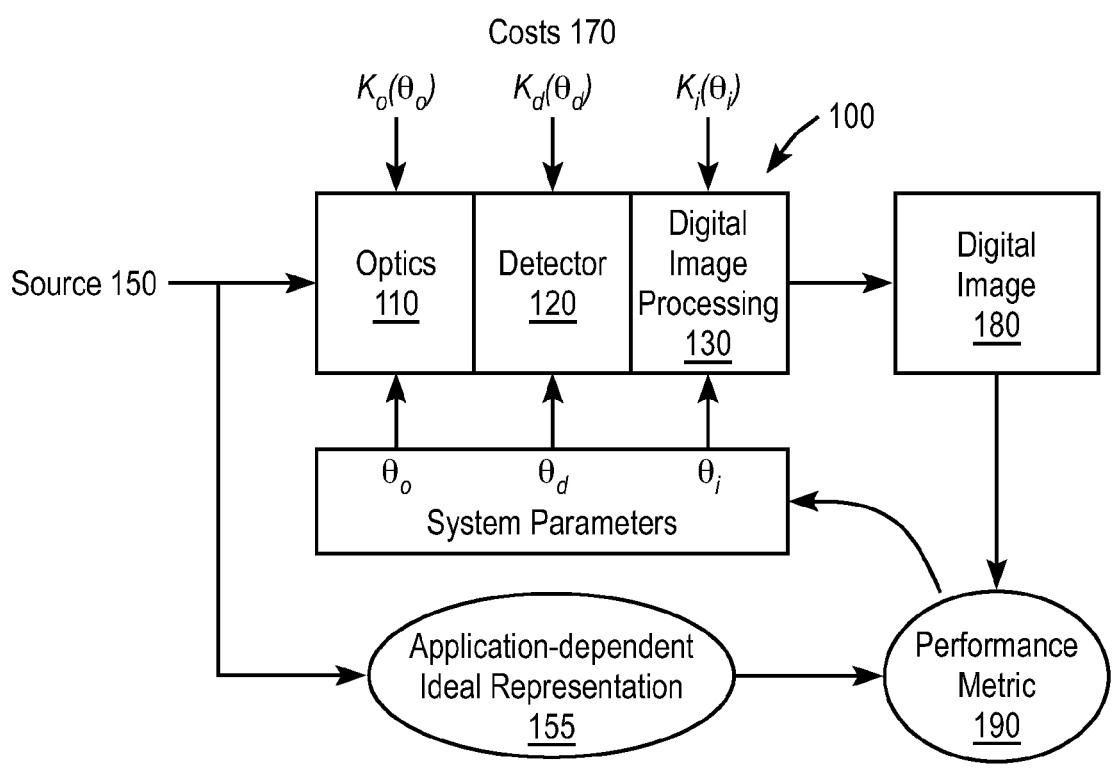
FIG. 1 is a block diagram illustrating the problem of designing an electro-optic imaging system.

FIG. 1 is a block diagram illustrating the problem of designing an electro-optic imaging system 100. The imaging system 100 includes an optical subsystem 110, detector subsystem 120 and digital image processing subsystem 130. The imaging system 100 is intended to image a source 150 and produces digital image 180. The general design problem is to design the imaging system 100 to "optimize" its overall performance, subject to certain constraints. In many cases, the goal of optimization is to produce a digital image 180 which matches the application-specific idealized version 155 of the input source.

Figure 2:
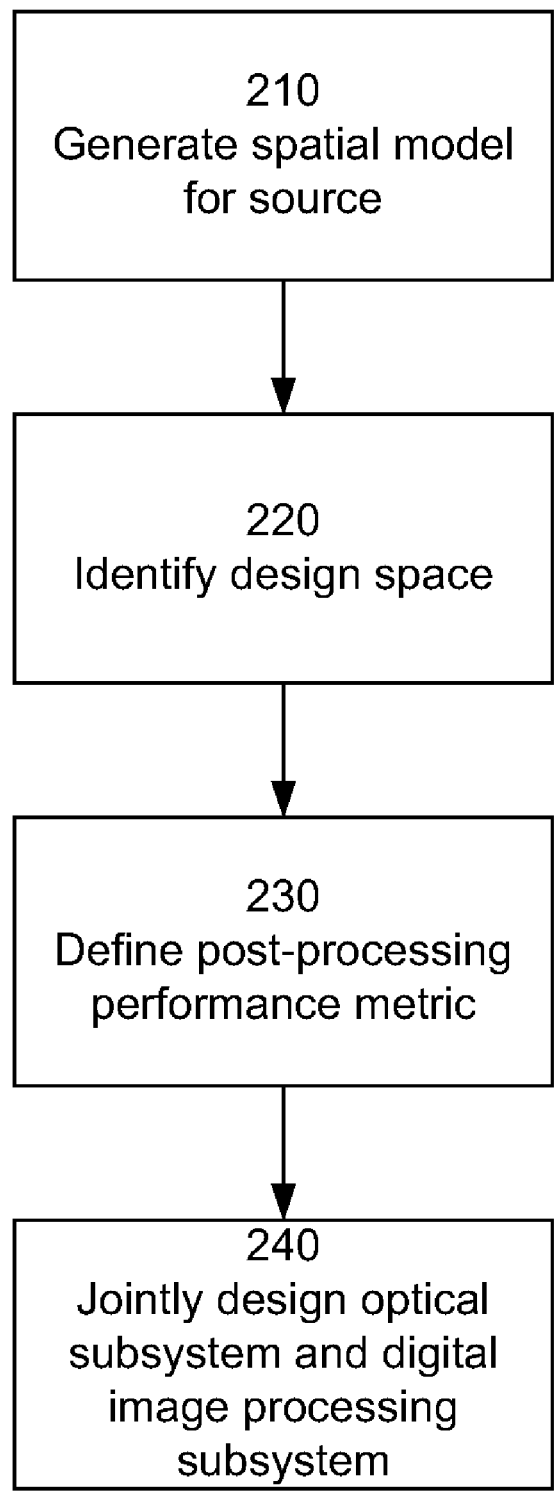
FIG. 2 is a flow diagram illustrating a method for designing an electro-optic imaging system according to the present invention.

FIGS. 1 and 2 illustrate an example method for designing an electro-optic imaging system 100 according to the present invention. Referring to FIG. 2, the design method includes generating 210 a spatial model of the source 150. The spatial model of the source may be derived for a specific situation, empirically measured, based on previously developed models or otherwise provided. Illumination, radiometry and geometry are factors that may be reflected in the source model. The spatial model preferably includes a statistical model of the source. Further examples will be described below.

The design space for the electro-optic imaging system is also defined 220. In FIG. 1, each of the subsystems is defined by its parameters $\theta_o$, $\theta_d$ and $\theta_i$, respectively. For example, the design space for the optical subsystem 110, described by the vector $\theta_o$, may be defined by number, type and size of lenses, radii of curvature, stops, etc. The design space for the detector subsystem 120, described by the vector $\theta_d$, may parameterize the number of pixels, detector spacing, fill factor, bandwidth, pixel geometry, etc. The design space for the digital image processing subsystem 130, described by the vector $\theta_i$, may identify the type(s) of digital image processing to be applied and parameters for that type of processing (e.g., linear or nonlinear filters, number of taps, tapweights, etc). Various non-imaging constraints or costs 170 associated with the designs may also be defined. The size of the design space of each subsystem will vary depending on the application. In some cases, there may be much latitude in designing a subsystem. In other cases, the design of the subsystem may be tightly constrained or even pre-defined (e.g., if the detector array is selected a priori).

A post-processing performance metric 190 is also defined 230. The performance metric is post-processing in the sense that it is based on performance after image processing rather than before image processing. For examples, measures of the wavefront error or spot size of the intermediate optical image produced by the optical subsystem alone may be conventional error metrics for the optical subsystem but they are not post-processing performance metrics. In FIG. 1, the post-processing performance metric 190 is based on a comparison of the digital image 180 produced by the imaging system 100 compared to the ideal digital image 155. In many design situations, the image 180 produced by the system is calculated by modeling propagation of the source characteristics 150 through the subsystems 110, 120 and 130 based on the spatial model of the source.

The design step 240 can be described as selecting a design within the design space that optimizes the post-processing performance metric 190, possibly subject to certain constraints (e.g., limits on certain costs 170). The optical subsystem 110 and the digital image processing subsystem 130 are designed together, rather than sequentially as is the case in conventional design approaches. Mathematically, using the notation of FIG. 1, the design step can be described as selecting the system parameters $\theta_o$, $\theta_d$ and $\theta_i$ to directly optimize the performance metric, possibly subject to certain constraints on the costs 170. For example, an image-based post-processing performance metric 190 may be optimized subject to a maximum financial cost. Alternately, the financial cost may be minimized subject to some minimum acceptable post-processing performance metric 190 for the digital image 180.

A number of optimization algorithms can be used. For some linear cases, parameters may be solved for analytically or using known and well-behaved numerical methods. For more complicated cases, including certain nonlinear cases, techniques such as expectation maximization, gradient descent and linear programming can be used to search the design space.

Note that in both FIGS. 1 and 2, there is no requirement for the optical subsystem 110, the detector subsystem 120 or the digital image processing subsystem 130, taken alone, to be optimal. It is quite possible for these subsystems to exhibit less than optimal performance when considered alone, while the overall electro-optic imaging system 100 still exhibits good or even optimal performance. This is in direct contrast to conventional design methods where, for example, the optical subsystem 110 typically is designed by directly optimizing the image quality of the intermediate optical image formed by it. For example, the optical subsystem 110 may be designed based directly on minimizing the RMS wavefront error or the RMS spot size. In contrast, for the design approach of FIG. 2, the intermediate optical image formed by the optical subsystem 110 may have worse image quality (e.g., as measured by wavefront error or spot size), which is then corrected by the digital image processing subsystem 130. The optical subsystem 110 is not designed based directly on improving the image quality of the intermediate optical image. Rather, it is designed jointly with the digital image processing subsystem 130, based directly on optimizing the post-processing performance metric 190.

FIGS. 3-6 provide further descriptions of examples of models of the source 150, optical subsystem 110, detector subsystem 120 and digital image processing subsystem 130. One specific model (but not the only model) is described, thereby presenting a unified framework for end-to-end performance evaluation. For each subsystem, important conceptual elements are described as well as the simplifying modeling assumptions that are used in later simulations.

Beginning with the source 150, the design method of FIG. 2 includes a spatial model of the source 150 when possible. In most scenarios, the universe of all possible source objects to be imaged is naturally constrained by the application. For instance, this universe of objects may be tightly constrained as in the case of a bar code reading system, or rather unconstrained as in the case of a general purpose consumer camera. Be it large or small, the boundedness of this space can offer important prior information for the system designer. For instance, knowing that the source is a binary level scanned document provides powerful constraints and information to the digital image processing subsystem in particular where one might implement the nonlinear stage of binarization of the final digital image.

In one approach, suppose that there exists a three-dimensional source luminance function, $s_{obj}(x_1, x_2, x_3, \lambda)$, which results from the complex interaction between three-dimensional scene geometry, reflectance, and illumination. In this simplified spatial model, assume that the signal represents the radiant intensity of incoherent light with wavelength $\lambda$ emanating from points in the three dimensional space defined by $(x_1, x_2, x_3)$. The purpose of the electro-optic imaging system 100 is to capture the two-dimensional projection of this source signal.

In one embodiment, the post-processing performance metric 190 is based on a comparison of the actual (or simulated) image 180 to some ideal image 155. The ideal image 155 can be modeled in different ways, one of which is presented below. In this example, in the case of a monochromatic camera system at wavelength $\lambda_0$, the idealized forward model can be modeled as $$s_{ideal}(k_1, k_2) = [B_T(x_1', x_2') * P(s_{obj}(x_1, x_2, x_3, \lambda))] \mid x_i' = Tk_i, \lambda = \lambda_0 \quad (1)$$

$$= [B_T(x_1', x_2') * s_{proj}(x_1', x_2', \lambda)] \mid x_i' = Tk_i, \lambda = \lambda_0 \quad (2)$$

$$= [s_{img}(x_1', x_2', \lambda)] \mid x_i' = Tk_i, \lambda = \lambda_0 \quad (3)$$

where $P(\bullet)$ represents the ideal projective (pinhole) transformation into the image coordinate space $x'_i$, and $B_T(\bullet)$ is an ideal bandpass filter with cutoff frequency matched to the spatial sampling period T. The indices $k_i$ represent the indices of the pixel locations of the final sampled image. Because the ideal image 155 is the goal for the imaging system 100, the effects of the subsystems are formulated in terms of their effect on the idealized image $s_{ideal}(k_1; k_2)$. As such, this model distinguishes between the source function s in the three-dimensional object space $s_{obj}$, after being projected onto the image plane $s_{proj}$, after passing through some idealized optics $s_{img}$ and after being sampled $s_{ideal}$. It is often convenient to represent the ordered collection of the samples $s_{ideal}$ by the vector s.

Information used to produce the spatial model of the source 150 may take several forms. The designer may possess detailed information about the three-dimensional geometry of the scene under consideration. Such information is commonly used to constrain the optics used in an imaging system. For instance, the optical designer typically desires to match the depth of focus of the optics with the expected depth of field of the scene in question to produce an image, free from defocus related optical aberrations. The optical designer, however, typically satisfies only very generic geometric constraints such as the bounding box of expected object depth. With more specific depth related information at his/her disposal, the system designer is capable of developing better designs for imaging systems.

The spatially varying luminance properties of the scene may also be used to model the source 150. For instance, when dealing with text or textual document images, the designer may have information relating to the language of the imaged text, or that the signal represents a binary source, etc. In the following examples, the information about the source signal is assumed to be statistical in nature and is modeled by a power spectral density function. Such information might be extracted from a corpus of scanned documents representative of those to be scanned by the fielded system or modeled from physical first principles. This knowledge can be especially useful in designing the digital image processing subsystem. Many image processing techniques rely on prior information regarding the contents of the scene under observation as imaged by an idealized imaging system. Note that this prior information may be derived from physical first principles or learned from a large collection of data. In one approach, a high quality imaging system captures data under a variety of imaging scenarios in an effort to learn the underlying statistics of the scene.

Figure 3A:
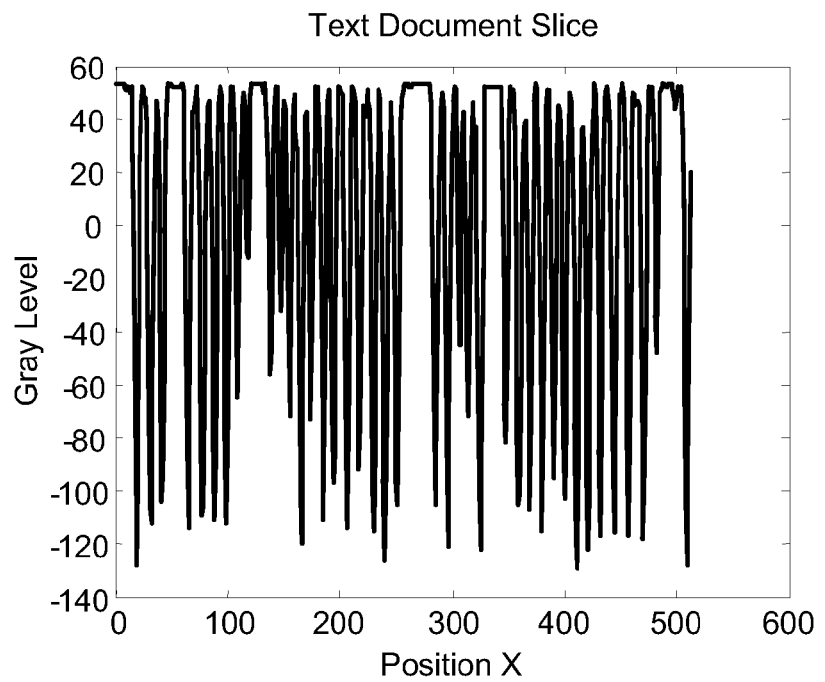
FIG. 3A illustrates luminance as a function of position for a slice of a scanned binary-level text document image.

In the following examples, for simplicity, the source signals are restricted to those which represent one-dimensional horizontal cross-sections of a text document (planar surface) imaged under monochromatic illumination. The source is modeled as a scalar function $s_{obj}(x)$. Such slices capture the desired signal output of a line scanner inside a copier or some other linear scanning device. For example, FIG. 3A shows an example of such a portion of a cross-sectional slice through a 12-pt font, double-spaced text document scanned at 300 dpi. Without loss of generality, the mean gray-level value has been subtracted from the signal.

Figure 3B:
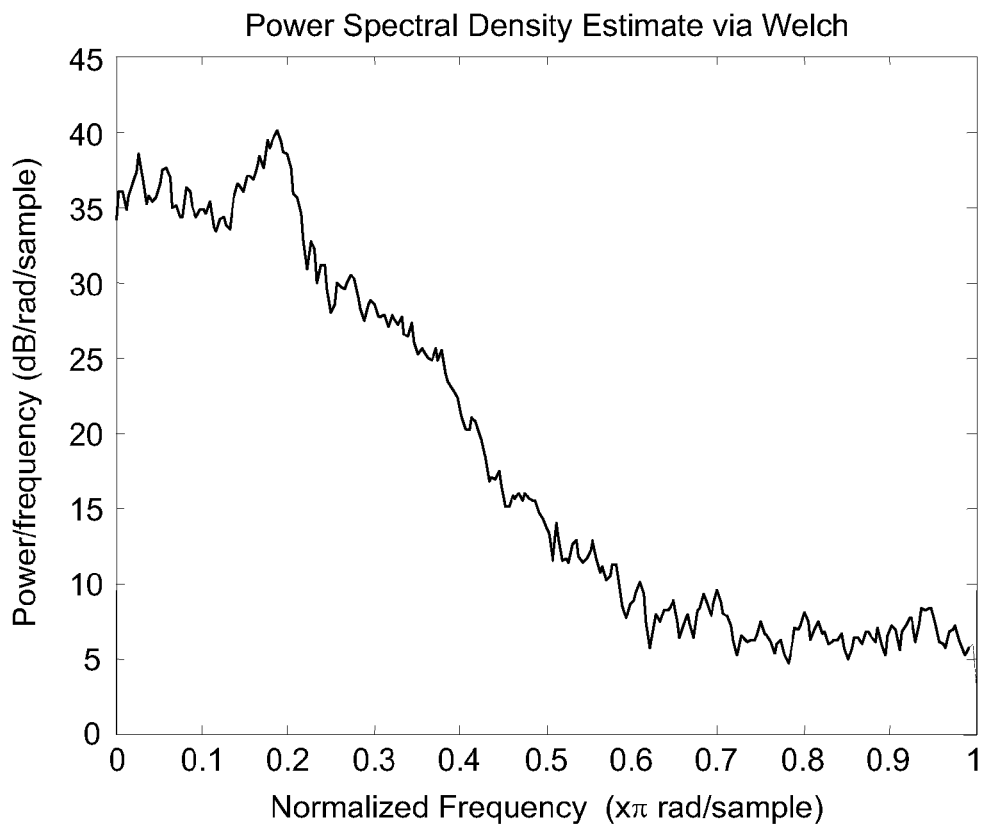
FIG. 3B is a graph of the estimated power spectral density of a scanned text document.

To estimate the statistical distribution of the source signal, a collection of slices through a page of 12 point text was selected. FIG. 3B shows an example of the power spectral density estimated using Welch's method (or periodogram method) in which the signal is broken into equal-sized blocks and the power spectrum estimated within each block.

FIGS. 3A-3B illustrate one example of a spatial model of a source 150. Other approaches can also be used. For example, non-stationary correlation statistics could be used to model the second order spatially-varying statistics. In addition, color histograms could be useful when designing polychromatic imaging systems. More complete probability distribution functions, as opposed to first and second order statistics, might be used to generate the spatial model of the source 150. Source sparsity might be used in certain scenarios where the source is known to contain only a few spectral or pseudo-spectral (wavelet) components. Source modeling techniques are particularly useful for specified imaging scenarios, such as those found in manufacturing, medical, or barcode scanners where the source is highly constrained to be in a small class of source functions.

Moving now to the optical subsystem 110, one convenient aspect of an incoherent optical subsystem is that it can be modeled as a linear system. To simplify the presentation, henceforth, the discussion will be based on the one-dimensional analogue of the full two-dimensional image signal. The extension to full two-dimensional signals is straightforward. In one approach, the effect on the idealized imaging system is modeled as a Fredholm integral equation of the first kind $$s_{img}(x',\lambda) = v(x') \int s_{proj}(\tilde{x},\lambda) h(x',\tilde{x},\lambda) d\tilde{x} \qquad (4)$$

where $h(x', \tilde{x}, \lambda)$ represents the spatially varying point spread function introduced by the optical system and $v(x')$ is the illumination loss due to vignetting or other loss of photons in the transmission process. The point spread function $h(\cdot)$ represents the accumulation of a variety of optical phenomena ranging from diffraction to geometric aberrations associated with the lens elements to the effects of multiple reflections between optical elements. The vignetting function depends on the geometry of the optical subsystem's various apertures. For simplicity, vignetting will be ignored in the following description.

In conventional lens design, the goal is to produce a faithful, or high fidelity intermediate optical image, and the ideal imaging subsystem has a point spread function of the form $$h_{ideal}(x',\tilde{x},\lambda) = \delta(x'-\tilde{x}) \qquad (5)$$

where $\delta(x)$ is a Dirac delta function. In other words, an infinitely small point source of light at any wavelength $\lambda$ in the object space $s_{obj}(x)$ would appear on the image plane as an infinitely small point source of light in the optical image space $s_{imag}(x')$, and the relationship between the object space coordinates x and the optical image space coordinates x' would follow from a simple projective transformation under the desired magnification factor of the optical subsystem. While the wave nature of light precludes such an ideal point source, an otherwise ideal or diffraction limited lens system would have the property that a geometric analysis would show all rays converging to an infinitely small point.

The point spread function for a given optical subsystem depends on the geometric aberrations of the subsystem through what is commonly known as the wavefront error or optical path difference (OPD). In an ideal imaging system, the wavefront at the exit pupil of the lens system would have a perfect spherical shape whose center is in the image focal plane. The geometric rays associated with such a wavefront would converge to a single point. Geometric aberrations of the image system correspond to a departure of the actual wavefront from this ideal reference sphere. The difference between the reference sphere wavefront and the actual wavefront measured at the exit pupil is known as the OPD. The OPD thereby captures the collection of a variety of geometric aberrations.

The wavefront error is related to the imaging system point spread function according to $$h(x',\tilde{x}) \approx |\int A(p_x) e^{jOPD(p_x,x')} e^{j2\pi p_x} dp_x|^2 \qquad (6)$$

where $OPD(p_x,x')$ is the wavefront error function in terms of the exit pupil coordinates $p_x$ and the image location coordinate x'. The function $A(p_x)$ is the magnitude of the exit pupil (most commonly either 0 or 1). Eqn. 6 can be recognized as the magnitude of the inverse Fourier transform of the pupil function $A(p_x) e^{jOPD(px,x')}$.

The overall goal of a traditional lens designer is to choose the set of optical design parameters $\theta_o$ to produce an optical subsystem with minimal wavefront error while satisfying other constraints such as minimum element edge width, minimum element spacing, etc. Since aberrations cannot be removed completely, the job of the traditional lens designer is to find a good balance between the different aberrations for the given application, costs, and related constraints. To accomplish this, the lens designer typically uses optical design software to vary the optical design in a manner that directly minimizes a merit function based on the aberrations or wavefront error.

Unfortunately, aberrations can be reduced only so much in a lens system of a given complexity (e.g., limited to a specific number of elements). Thus, the typical paradigm for achieving high-quality imaging systems invariably requires adding more lens elements to the optical subsystem, at a significant increase in overall cost. For example, a common approach to reducing spherical aberration involves splitting the required power of the overall lens system over a larger number of lenses in order to reduce the surface curvature at each lens. In the example described later, the end-to-end design method reduces the traditional costs associated with improving imaging performance.

Figure 4:
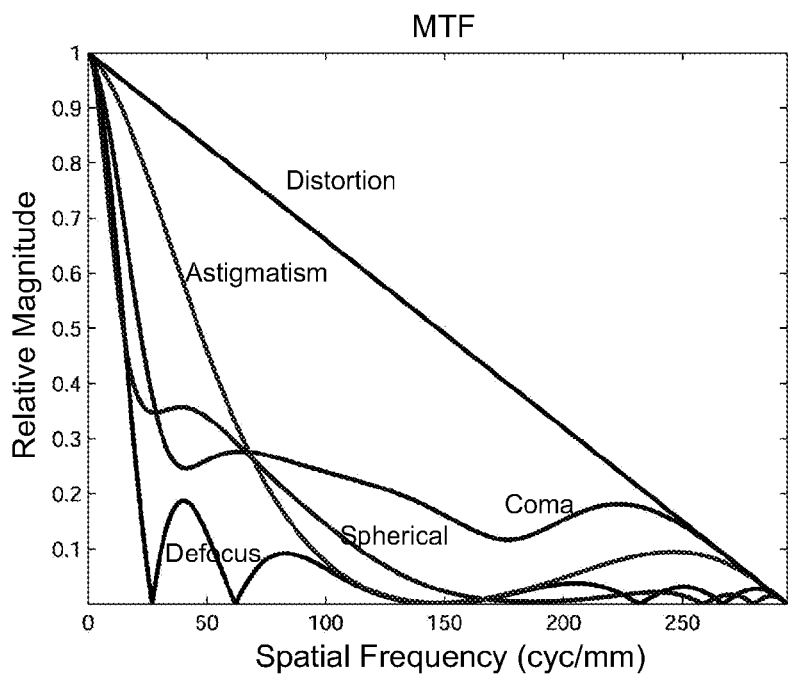
FIG. 4 graphs modulation transfer functions for four of the Seidel aberrations and for the defocus aberration.

The optical subsystem can also be modeled by its optical transfer function (OTF) or modulation transfer function (MTF). The OTF is the Fourier transform of the point spread function at a particular image coordinate x':

$$OTF(x',\omega) = \int h(x',\tilde{x}) e^{-j2\pi x \omega} d\tilde{x} \qquad (7)$$

where $\omega$ is a spatial frequency in units of cycles per meter. The MTF is the normalized magnitude of the OTF. That is, MTF $(x', \omega)) = |OTF(x', \omega)|/|OTF(x', 0)|$. The MTF offers a convenient means of evaluating the image quality of the optical subsystem. FIG. 4 shows the MTF associated with four of the Seidel aberrations and the defocus aberration, each having the same OPD-RMS error. The MTF's shown are associated with the imaging system at 50 percent of full field. Each of the MTF curves corresponds to an optical system having five waves of only a single aberration. It is evident from FIG. 4 that each of the aberrations has a different effect on the final image. Note that, according to standard optical performance metrics based on the OPD-RMS error, these optical systems are "equally good," yet the relative ease with which image processing can correct such systems differs significantly.

In many cases, certain aberrations are more correctable by the digital image processing subsystem than others. The end-to-end design approach typically takes advantage of this, while the traditional lens design approach typically does not. To oversimplify for purposes of illustrating this point, assume that all aberrations can be rated according to their correctability via image processing techniques. The aberrations at the correctable end of the scale can be mostly or fully compensated by the digital image processing subsystem while those at the non-correctable end of the scale cannot. In a traditional design, the distinction between correctable and non-correctable aberrations is not recognized. Instead, the optical subsystem is designed to create an intermediate optical image of high image quality. Thus, for example, the lens system may be designed to reduce correctable and non-correctable aberrations equally to some moderate level. During subsequent digital image processing, the correctable aberrations are further reduced to a lower level digitally, but the non-correctable aberrations remain at their moderate level. Furthermore, correctability can vary significantly depending on the characteristics of the source, which typically is not accounted for in traditional approaches to designing optical subsystems.

In contrast, in the end-to-end design approach, it is recognized that the correctable aberrations can be compensated for by the digital image processing subsystem. Thus, the optical subsystem emphasizes reduction of those aberrations which are difficult to correct during subsequent image processing. The intermediate optical image may contain a lower level of non-correctable aberrations and a higher level of correctable aberrations. As a result, the intermediate optical image may be of lower image quality due to the higher level of these correctable aberrations. However, these are subsequently reduced by the digital image processing subsystem to a lower level so that the overall electro-optic imaging system has high performance. The end-to-end approach allows the designer to allocate correction between the various subsystems. For example, if digital image processing is inexpensive compared to lenses, the designer may select a simple but low performance optical subsystem followed by a complicated digital image processing subsystem.

Figure 5A:
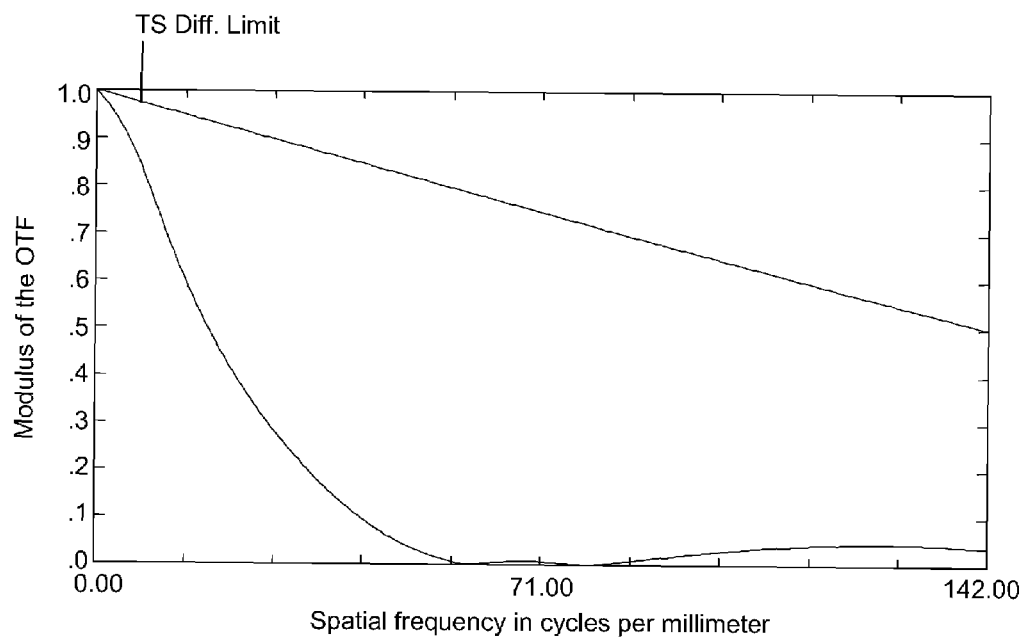
FIGS. 5A-5B are MTF's of a singlet at various focus positions.
Figure 5B:
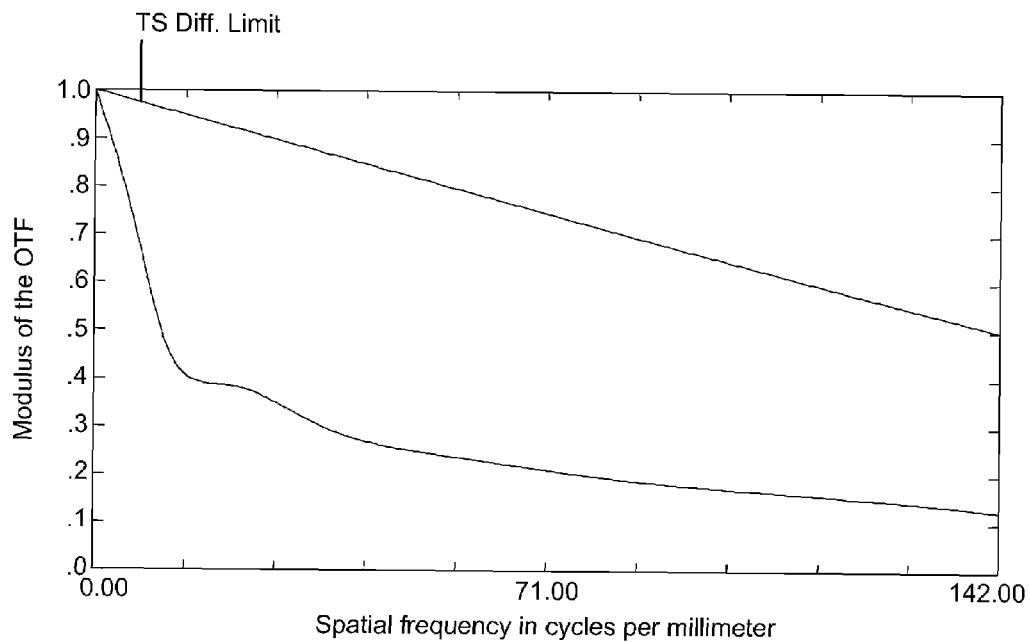

For example, FIGS. 5A-5B show the MTFs of a singlet at two different defocuses. FIG. 5A is the MTF at the position that minimizes the OPD-RMS. FIG. 5B is the MTF at approximately +0.5 mm behind the position of FIG. 5A. In FIG. 5A, the OPD function is minimized in terms of the OPD-RMS (also in terms of peak-to-valley OPD or OPD-PV). However, the MTF curve has a zero crossing at around 65 lp/mm. Because of this zero crossing, it is significantly more difficult for digital image processing to restore the signal at frequencies above this cutoff. In FIG. 5B, at a focal distance of +0.5 mm, the zero crossing in the MTF vanishes even though the RMS wavefront error is significantly larger than in FIG. 5A, both as measured by OPD-RMS and OPD-PV. At this point, the point spread function has a wider central peak, suggesting degraded low-frequency spectral performance but without irreparable loss to the image signal.

At the point of wavefront minimizing focus (FIG. 5A), the focus aberration balances the spherical aberration. The paraxial focal length is close to +1.0 mm from the OPD-RMS minimizing focus so as the focus moves past this point (e.g., to FIG. 5B), the positive spherical aberration becomes the dominant optical aberration while the defocus aberration is reduced. In this singlet example, compared to defocus, the positive spherical aberration is easier to correct with digital image processing.

A traditional designer might select the design of FIG. 5A since it has the lower OPD-RMS. In contrast, an end-to-end designer might select the design of FIG. 5B, using digital image processing to compensate for the larger OPD-RMS.

Moving now to the detector subsystem 120, modeling the detector bridges the divide between the realm of light rays and the realm of bits and image pixels. As indicated in Eqn. 3, the ideal projected image $s_{proj}(x', \lambda)$ would be filtered by an ideal bandpass filter matched to the spatial sampling period T. The bandpass filter would prevent aliasing while perfectly maintaining the spectral properties of the image within the sampling bandwidth.

Figure 6:
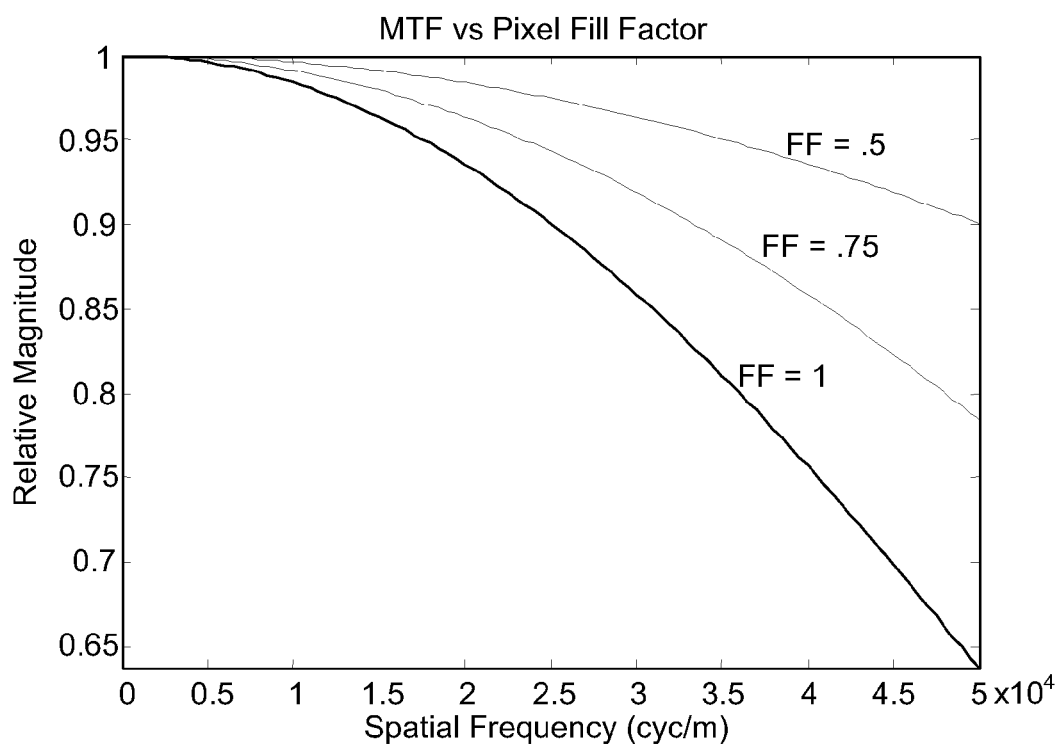
FIG. 6 graphs the modulation transfer functions of rectangular detector pixels with different fill factors.

In practice, the bandpass filter is determined in large part by the sensor geometry. In many imaging sensor devices, such as charge coupled devices (CCDs), the sensing area of the detector associated with an individual pixel corresponds to a rectangular shape whose area is a percentage of the overall pixel size. The percentage of the pixel spacing which captures photons is known as the fill factor. Detectors with larger fill factors offer the advantage of capturing more light as well as eliminating aliased image content. FIG. 6 shows the MTF of rectangular pixels with different fill factors, each having a pixel spacing (sampling period T) of 10 microns. The MTF plot is shown, up to the Nyquist sampling rate. The shape of the MTF curves is the magnitude of the sinc function shown only up to the Nyquist sampling limit. For smaller fill factors, the amount of aliased image content increases.

In the following examples, it is assumed that the image signal contains negligible amounts of information above the sampling rate. Therefore, the effects of aliasing are ignored. Assuming monochromatic illumination, the imaging system can be modeled using vector notation. Let s be the ideal sampled image and H be the sampled point spread function of the combined optical and detector subsystems. Each element of the matrix H is given by $$[H]_{jk} = h_{tot}(x'=Tj, \tilde{x}=Tk), \quad (8)$$

where the point spread function $h_{tot}(x', \tilde{x})$ is the inverse Fourier transform of the product of the optical transfer functions due to the optical subsystem and the detector subsystems:

$$OTF_{tot}(x', \omega) = OTF_{optics}(x', \omega) OTF_{det}(x', \omega). \quad (9)$$

Based on this, the imaging process (i.e., the optical subsystem and detector subsystem together) can be modeled as:

$$y = Hs + n, \quad (10)$$

where y is an image of the source after propagation through the optical subsystem and the detector subsystem and n is the random noise associated with the imaging system.

To capture the statistics of the imaging detector, the noise n is modeled as additive white Gaussian noise with variance $\sigma^2 = 1/\min(P,1)$, where P reflects the ratio of the total number of photons striking the detector over the given integration period divided by the well capacity of the detector. To normalize the entire process, assume that s represents some power-normalized sampled signal whose gray level values fall in the range of 0 to 255 (i.e., an 8-bit system). Furthermore, assume that enough photons are captured by the detector such that other noise contributions (thermal, dark current, etc.) are negligible compared to the photon or shot noise. Photon or shot noise represents the statistical variability associated with an individual photon being registered by the detector. Also make the simplifying assumption that the noise power is not spatially dependent on the signal s, but instead depends on the overall signal power as reflected by the total number of photons. As such, the general noise power $\sigma^2$ is normalized in the sense that at maximal detector well capacity (P=1), the noise power corresponds to 1 bit (a conservative estimate). When P<1 (fewer photons available), however, the effective noise power is increased. The proportion of available photons depends on the product of the aperture area and the integration time. The idea can be extended to other noise statistics such as Poisson, Poisson plus Gaussian, etc.

Consider now the digital image processing subsystem 130. There exists a wide range of possible image processing techniques for improving performance of the electro-optic imaging system and it is not feasible to discuss here all possible image processing techniques. In the following example, the digital image processing subsystem uses techniques aimed at restoring the signal degraded by the point spread function (PSF). Furthermore, the restoration problem is approached from an estimation theoretic perspective in this example.

In general, there exists a wide range of possible restoration approaches that can be used to restore a signal s from the observed signal y, ranging from simple linear filters to iterative nonlinear techniques. The following examples describe certain techniques that each seek an optimum to well-defined performance measures and that exhibit predictable performance. In addition, while the following examples are based on post-processing performance metrics that compare ideal and actual images, other implementations might seek to optimize some empirical or nonanalytic measure, for instance the recognition accuracy in optical character recognition or in a bar code reader.

One class of restoration techniques is based on linear processes. These are generally simple to analyze formally and easy to implement in an actual system. In the linear framework, the original signal is estimated using a linear operator of the form:

$$\hat{s} = Ry. \tag{11}$$

In this example, the minimum mean square error (MMSE) is used as the Lyapunov or target function. Referring to FIG. 1, the electro-optic imaging system 100 is optimized such that the sum of the squared deviations between an ideal image 155 and the actual digital image 180 is minimized. Here, the ideal image is the bandlimited, noise-free digital image that would arise from a theoretical pinhole imaging system with sufficient illumination and in the absence of diffraction. Thus, the goal is to find the filter matrix R satisfying $$\min_R \varepsilon_{n,s}[\|Ry - s\|^2], \tag{12}$$

where the subscript of the expectation operator $\varepsilon$ represents an expectation taken over the random noise n and the (assumed) stationary random signal s. The MMSE filtering approach requires no assumptions about the statistical properties of the underlying signal or noise models other than their respective means and covariance structures. Under the assumption that the noise and the signal are uncorrelated, the ideal linear restoration matrix is given by $$R = C_s H^T [H C_s H^T + C_n]^{-1} \tag{13}$$

where $C_s$ and $C_n$ represent the covariance matrices of the signal and the noise respectively. The per-pixel MSE performance is predicted by such a system using $$1/N \mathrm{Tr}[(RH-I)C_s(RH-I)^T + RC_n R]. \tag{14}$$

where Tr[ ] is the trace operator and N is the number of pixels in the entire image.

Utilizing nonlinear restoration techniques widens the space of possible post-processing performance metrics. For instance, the class of nonlinear iterative restoration techniques is often statistically motivated, such as Maximum Likelihood (ML) or Maximum A-Posteriori (MAP). Such approaches have the benefit of being asymptotically unbiased with minimum error variance, which are stronger properties than MMSE.

For instance, assuming that the signal s is a deterministic, yet unknown signal, the ML estimate of the signal satisfies $$\hat{s} = \max_s L(y \mid s), \tag{15}$$

where L(y|s) is the statistical likelihood function for the observed data. Since it is assumed in this particular example that the additive noise in the signal model is Gaussian, the ML cost function reduces to a least squares (LS) objective function $$\hat{s} = \min_s \|y - Hs\|^2 \tag{16}$$

$$= [H^T H]^{-1} H^T y. \tag{17}$$

For signals of large dimension (i.e. large numbers of pixels), it may become prohibitive to explicitly construct these matrices. Often, iterative methods are utilized to minimize Eqn. 16 eliminating the need to explicitly construct the matrices. In many situations (for instance severe defocus), the operator H is rank-deficient leading to unstable solutions. In such cases, additional information, such as source power spectral density information or source functional smoothness, can be used to constrain the space of solutions.

When statistical prior information exists about the unknown signal, the MAP cost function becomes $$\hat{s} = \min_s \|y - H(\tau)s\|^2 + \psi C(s) \tag{18}$$

where C(s) represents the prior information about the unknown signal and $\psi$ represents a Lagrangian-type relative weighting between the data objective function and prior information. Cost functions of this form may not permit analytic solutions as in Eqn. 17. The Cramer-Rao inequality could be used to bound as well as predict asymptotically the nonlinear estimator performance.

Figure 7:
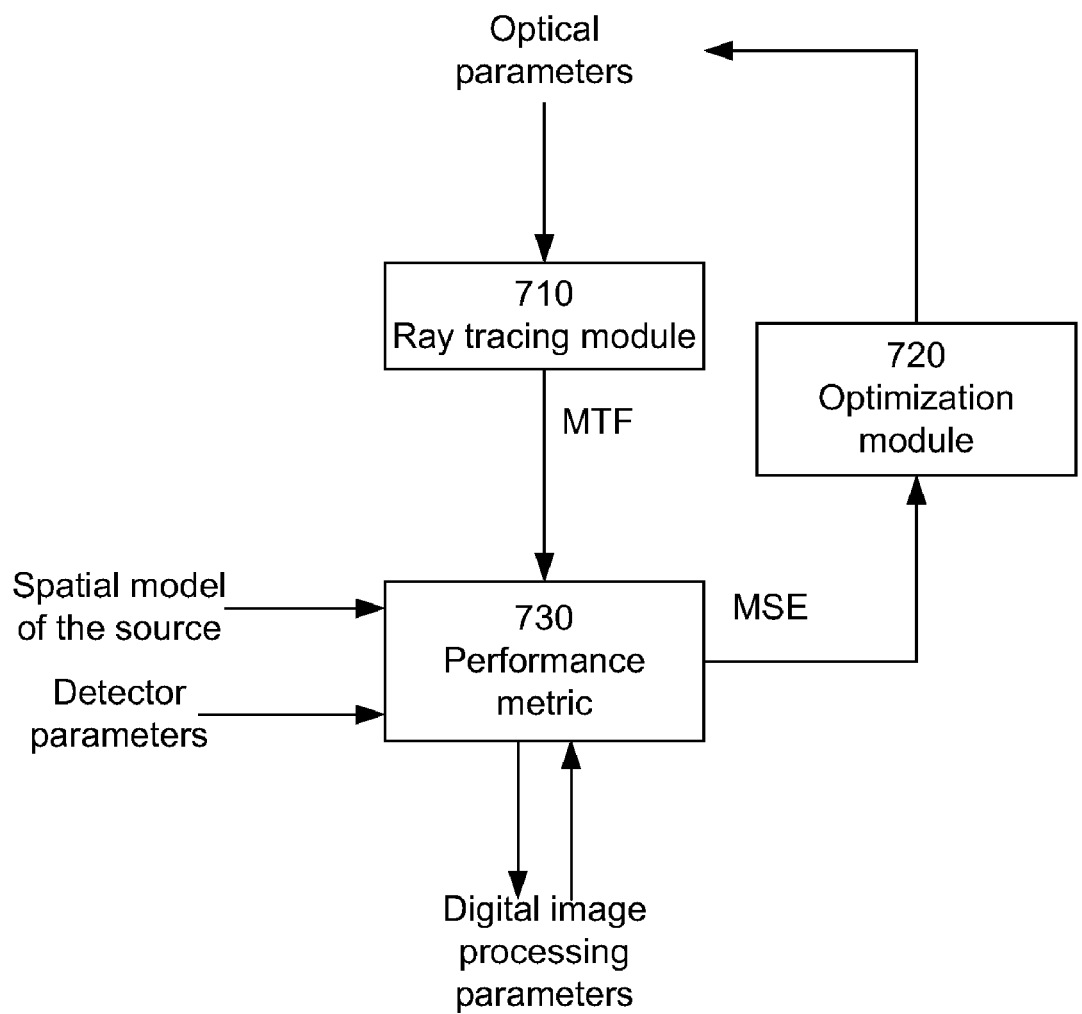
FIG. 7 is a block diagram illustrating one software implementation of the end-to-end design approach.

The end-to-end design approach described above can be implemented in many different ways. FIG. 7 is a block diagram illustrating one software implementation based on commercially available lens design programs, such as Zemax. These programs typically have ray tracing capability 710 as well as optimization capability 720. In a conventional lens design, the designer would first identify the potential design space for the lens system by entering a description of the lens design problem. This description typically would include source points to be ray traced and a general description of the lens system (curvatures, thicknesses, spacings, etc.) as well as which lens design parameters are to be iterated. The ray tracing module 710 would trace rays from the source points through the lens system to the image plane. The optimization module 720 would iterate on the optical design parameters in order to directly optimize some cost function, typically the OPD-RMS, subject to other design constraints (minimum edge thicknesses, edge spacings, etc).

The implementation of FIG. 7 takes advantage of the built-in ray tracing and optimization functions, but replaces the wavefront error function with a post-processing performance metric 730 that takes into account the entire electro-optical system. Specifically, the output of the ray tracing module 710 is the OTF of the optical subsystem (or information that can be used to calculate the OTF) for several locations across the image field. In this example, the OTF is spatially-varying and approximated by interpolation between grid points. This same approach can be used for spatially-varying point spread functions or MTFs. Module 730 receives the MTF information as one input. It also uses the spatial model of the source (which typically will be different than the source points used in the ray tracing), and information about the detector subsystem and digital image processing subsystem to model propagation of the source through the electro-optic imaging system.

The post-processing performance metric module 730 may have self-contained loops or optimizations. For example, a different digital image processing subsystem may be designed for each new OTF and this process may or may not be iterative. Module 730 outputs the post-processing performance metric, which is used by the optimization module 720 to iterate the design of the optical subsystem. Note that the design of the digital image processing subsystem changes as the design of the optical subsystem changes. Different image processing is used to compensate for different errors introduced by different optical subsystems. Thus, the optical subsystem and the digital image processing subsystem are jointly designed based on the post-processing performance metric. For example, the design software may generate linear filter coefficients, as well as the final optical subsystem design.

FIG. 7 is just one example implementation, which is driven primarily by the availability of ray tracing and optimization modules 710 and 720 in commercially available lens design programs. Other implementations will be apparent. For example, in an alternate embodiment, the software architecture is based on the block diagram of FIG. 1. One software module implements the spatial model of the source 150. Other modules implement propagation of the source through the various subsystems 110, 120 and 130. These propagation modules receive the current system parameters and cost functions as inputs. Another module receives the simulated digital image 180 and ideal image 155 as inputs, and calculate the post-processing performance metric 190 based on them. This is used to iterate the system parameters.

The design approach described above is now applied to a specific example, comparing the results to those achieved by a conventional design approach. This example is the design of a simple document scanning system. This scanner system has the following specifications Numerical Aperture: NA=0.012
Pixel Spacing: T=10 μm
Fill Factor: 75 percent
Effective Focal Length: f=85 mm
Object Distance: $z_o$=500 mm
Wavelength: λ=500 nm
Field Width: x'ϵ[−150, 150] mm A set of sixteen document slices of a 12 pt text document sampled at 300 dpi was used to build the source model. The test slices used were selected by hand to ensure that the slice captured a line of text. The MSE is used to quantify the performance. The MSE is calculated by simulating the sixteen slices as they are aberrated by the imaging system's point spread function and then taking an average over the sixteen slices.

Figure 8:
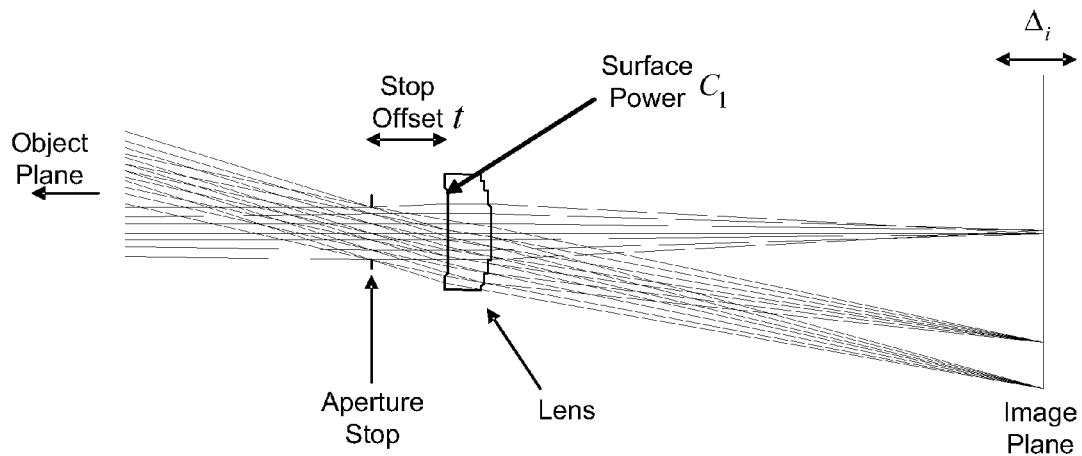
FIG. 8 is a diagram illustrating the design space of a singlet lens system.

FIG. 8 is a diagram illustrating the design space of a singlet lens system. This system is composed of a stop offset from a single lens by a spacing t. The optical element is assumed to be BK7 glass with an index of refraction of 1.52 and a thickness of 8 mm. The design parameters for the singlet lens are $\theta_o = [t; C_1, \Delta_i]^T$ where t is the spacing between the lens and the aperture stop in front of the lens, $C_1$ is the surface power (inverse of the radius of curvature) of the first surface of the lens, and $\Delta_i$ is the distance from the paraxial focal plane.

To simulate the traditional design approach, the optimal set of lens parameters are determined by using the OPD-RMS as the design merit function. The optimization uses three field locations x' corresponding to the object field points of [0, 105, 150] mm when evaluating the OPD-RMS. In this example, only the first and third order terms of the aberration polynomial are used during optimization. In other words, only the Seidel aberrations are used when calculating the OPD. While such a method ignores the higher-order aberrations, the majority of the aberration power is contained in these lower order terms in simple lens systems, although in other cases, standard ray tracing software can be used to compute the complete OPD. Using Matlab's fminunc function to find the optimal set of design parameters that directly minimizes the centroid-referenced OPD-RMS yielded a set of lens parameters $\theta_o = [18; -0.0068, -1.125]^T$. These design parameters were similar to those produced using the ZEMAX default wavefront RMS optimization routine, which directly minimizes the RMS wavefront error. The minimized OPD-RMS was 2.22 waves of wavefront error.

Continuing the conventional design approach an optimal linear restoration filter matrix R was designed using Eqn. 13 to match this optical subsystem, assuming uncorrelated, additive noise with power of σ=1. The per-pixel RMSE averaged over the sixteen test scans for this conventionally designed electro-optic imaging system was 6.78 gray levels, which is rather poor performance.

For comparison, another electro-optic imaging system was designed using the end-to-end approach described above, assuming that the digital image processing subsystem implements optimal linear restoration. A coarse local optimization of the conventional design was performed using the RMSE of Eqn. 14 as the post-processing performance metric. The resulting optical subsystem was $\theta_o = [14; -0.0004, -0.15]^T$ with an RMSE of 2.25 gray levels of error, compared to 6.78 gray levels for the conventional design. The corresponding OPD-RMS for the intermediate optical image was 6.3 waves of error, compared to 2.22 waves for the conventional design. Thus, although the end-to-end designed optical subsystem produced an intermediate optical image with significantly greater wavefront error (6.3 waves versus 2.22 waves), the final digital image had a significantly lower RMSE (2.25 gray levels versus 6.78 gray levels).

Figure 9:
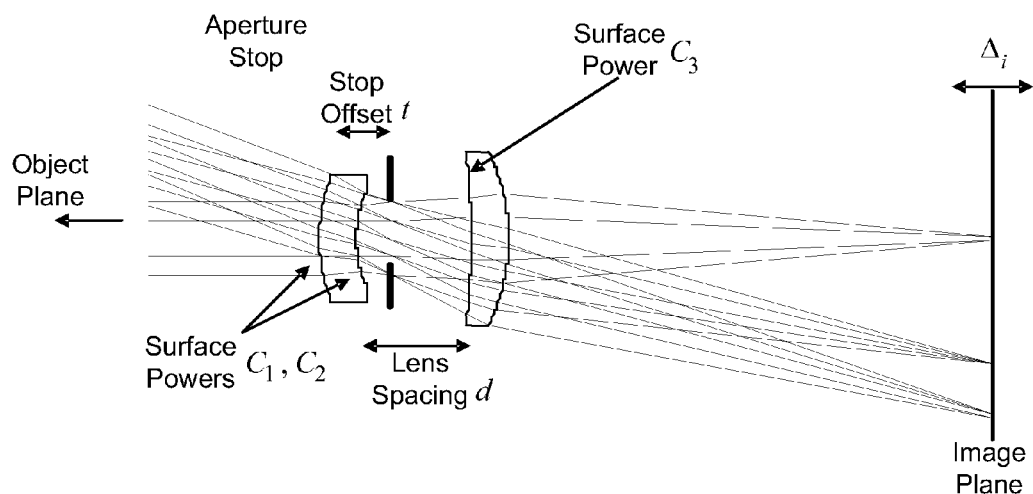
FIG. 9 is a diagram illustrating the design space of a doublet lens system.

FIG. 9 is a diagram illustrating the design space of a doublet lens system, which includes two optical lens elements with an aperture stop located between the two elements. Adding elements to an optical system remains the most powerful tool available to the optical designer to improve wavefront error. A doublet system was thus designed for comparison to the singlet lens systems. The extra lens offers twice the degrees of freedom with which to combat the effects of optical aberrations. However, adding elements to an optical system also increases the cost associated with an optical system.

The doublet design includes two optical elements separated by a distance d with an aperture stop located between the lens elements at a distance t from the back of the first element. Both optical elements are assumed to be BK7 glass with an index of refraction of 1.52 and a thickness of 8 mm. The design variables for the doublet lens system are $\theta_o=[d; t; C_1, C_2, C_3, \Delta_i]^T$ where the $C_i$ terms define the surface powers of the lens elements.

The conventionally designed doublet system is designed in the same manner as the singlet system. First, the optical subsystem is designed to directly minimize the wavefront OPD-RMS merit function. The optimization produces a design of $\theta_o=[21.63, 5:57, 0.0527, 0.0739, -0.0094, 0.278]^T$, with a wavefront error of 0.51 waves of OPD-RMS error. Adding the additional lens improves the wavefront error to nearly ⅕ of that associated with the single lens system. As before, the optimal restoration filter is selected for this particular optical subsystem, yielding a final RMSE error of 3.01 gray levels. While the traditionally designed doublet system reduces the RMSE error by more than half, the singlet system designed using the end-to-end approach is still slightly superior (2.25 gray levels). Thus, using the end-to-end design approach yielded a simpler, and hence cheaper, singlet optical subsystem where the overall performance of the electro-optic imaging system was comparable to that using a more expensive doublet lens system designed in a traditional fashion.

Although the detailed description contains many specifics, these should not be construed as limiting the scope of the invention but merely as illustrating different examples and aspects of the invention. It should be appreciated that the scope of the invention includes other embodiments not discussed in as much detail above, such as the full two-dimensional detector arrays, higher order aberrations, and nonlinear image processing.

As another example, in the description above, the source object geometry was a simple plane at a known distance. One variation is to apply a probability distribution on the distance $z_o$ of the object to account for possible mechanical tolerances or defocus. As another example, for purposes of clarity, the cases described above were primarily monochromatic. Polychromatic cases can also be accommodated. The models used could include wavelength information and/or color sampling equations. Also, while the example optical subsystems are all lens-based, this is not a requirement. Mirrors, diffractive and other optical elements can also be used.

Various other modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A computer-implemented method for designing an electro-optic imaging system for imaging a source, the electro-optic imaging system including an optical subsystem, a detector subsystem and a digital image processing subsystem, the method comprising executing instructions to cause a processor to effect the steps of:

modeling propagation of the source through the optical subsystem, the detector subsystem and the digital image processing subsystem based on a spatial model of the source, wherein the spatial model of the source includes a statistical model of the source, and wherein propagation through the optical subsystem and detector subsystem is modeled by y=Hs+n, where y is an image of the source after propagation through the optical subsystem and the detector subsystem, s is an ideal sampled image of the source, H is a sampled point spread function accounting for both the optical subsystem and the detector subsystem, and n is noise; and jointly designing the optical subsystem and the digital image processing subsystem based directly on a post-processing performance metric that is a function of a mean square error between an ideal image of the source and an image predicted by the modeled propagation of the source through the optical subsystem, the detector subsystem and the digital image processing subsystem.

2. The method of claim 1 wherein the step of jointly designing the optical subsystem and the digital image processing subsystem is performed without requiring a direct optimization of an image quality of an intermediate optical image of the source formed by the optical subsystem.

3. The method of claim 2 wherein the step of jointly designing the optical subsystem and the digital image processing subsystem is performed without requiring a direct minimization of a wavefront error of the intermediate optical image or a direct minimization of a spot size of the intermediate optical image.

4. The method of claim 1 wherein the spatial model of the source is based on a three-dimensional luminance function of the source.

5. The method of claim 1 wherein the spatial model of the source includes a two-dimensional power spectral density function.

6. The method of claim 5 wherein the power spectral density function is based on physical principles of the source.

7. The method of claim 5 wherein the power spectral density function is based on empirical sampling of different sources.

8. The method of claim 1 wherein the source is binary and the spatial model of the source accounts for the binary nature of the source.

9. The method of claim 1 wherein the source has a certain depth of field and the spatial model of the source accounts for the depth of field.

10. The method of claim 1 wherein propagation through the optical subsystem additionally accounts for vignetting in the optical subsystem.

11. The method of claim 1 wherein the sampled point spread function H is spatially-varying.

12. The method of claim 1 wherein the sampled point spread function H is spatially-varying and approximated by interpolation.

13. The method of claim 1 wherein propagation through the detector subsystem is modeled by spatial filtering to account for detector shape, charge efficiency, sampling or other effects of the detector subsystem.

14. The method of claim 1 wherein the noise n is additive white Gaussian noise.

15. The method of claim 1 wherein the step of jointly designing the optical subsystem and the digital image processing subsystem is limited to digital image processing subsystems that restore degradation caused by the point spread function of the optical subsystem and/or the detector subsystem.

16. The method of claim 15 wherein the step of jointly designing the optical subsystem and the digital image processing subsystem is limited to linear digital image processing subsystems that restore degradation caused by the point spread function of the optical subsystem and/or the detector subsystem.

17. The method of claim 15 wherein the step of jointly designing the optical subsystem and the digital image processing subsystem includes non-linear digital image processing subsystems that restore degradation caused by the point spread function of the optical subsystem and/or the detector subsystem.

18. The method of claim 1 wherein the post-processing performance metric is a spatially-weighted mean square error between an ideal image of the source and an image predicted by the modeled propagation of the source through the optical subsystem, the detector subsystem and the digital image processing subsystem.

19. The method of claim 1 wherein the ideal image of the source is based on an ideal geometric projection of the source, filtered and sampled to account for an ideal geometry for the detector subsystem.

20. The method of claim 1 wherein the designed optical subsystem reduces aberrations in the optical subsystem that are not easily correctable by the digital image processing subsystem.

21. The method of claim 1 wherein the step of jointly designing the optical subsystem and the digital image processing subsystem is subject to one or more non-imaging constraints.

22. The method of claim 21 wherein the non-imaging constraints include cost constraints.

23. The method of claim 21 wherein the non-imaging constraints include constraints on size or shape.

24. The method of claim 1 further comprising:
generating a description of the optical subsystem.

25. The method of claim 24 further comprising:
generating linear filter coefficients for the digital image processing subsystem.

26. A computer readable storage medium containing instructions to cause a processor to design an optical subsystem of an electro-optic imaging system by executing the following steps:
modeling propagation of a source through an electro-optic imaging system; the electro-optic imaging system comprising an optical subsystem, a detector subsystem and a digital image processing subsystem; wherein modeling propagation is based in part on a spatial model of the source, wherein the spatial model of the source includes a statistical model of the source, and wherein propagation through the optical subsystem and detector subsystem is modeled by y=Hs+n, where y is an image of the source after propagation through the optical subsystem and the detector subsystem, s is an ideal sampled image of the source, H is a sampled point spread function accounting for both the optical subsystem and the detector subsystem, and n is noise; and
jointly designing the optical subsystem and the digital image processing subsystem based directly on a post-processing performance metric that is a function of a mean square error between an ideal image of the source and an image predicted by the modeled propagation of the source through the optical subsystem, the detector subsystem and the digital image processing subsystem.

27. The computer readable storage medium of claim 26 wherein the step of jointly designing the optical subsystem and the digital image processing subsystem is performed without requiring a direct optimization of an image quality of an intermediate optical image of the source formed by the optical subsystem.

28. The computer readable storage medium of claim 26 wherein the spatial model of the source includes a two-dimensional power spectral density function.

29. The computer readable storage medium of claim 26 wherein the source is binary and the spatial model of the source accounts for the binary nature of the source.

30. The computer readable storage medium of claim 26 wherein the step of jointly designing the optical subsystem and the digital image processing subsystem is limited to linear digital image processing subsystems.

31. The computer readable storage medium of claim 26 wherein the instructions further cause the processor to execute the step of:
generating linear filter coefficients for the digital image processing subsystem.

32. An optical subsystem that is part of an electro-optic imaging system, the electro-optic imaging system further comprising a detector subsystem and a digital image processing subsystem, the optical subsystem designed by the process of:
modeling propagation of the source through the optical subsystem, the detector subsystem and the digital image processing subsystem based on a spatial model of the source, wherein the spatial model of the source includes a statistical model of the source, and wherein propagation through the optical subsystem and detector subsystem is modeled by y=Hs+n, where v is an image of the source after propagation through the optical subsystem and the detector subsystem, s is an ideal sampled image of the source, H is a sampled point spread function accounting for both the optical subsystem and the detector subsystem, and n is noise; and
jointly designing the optical subsystem and the digital image processing subsystem based directly on a post-processing performance metric that is a function of a mean square error between an ideal image of the source and an image predicted by the modeled propagation of the source through the optical subsystem, the detector subsystem and the digital image processing subsystem.

* * * * *

UNITED STATES PATENT AND TRADEMARK OFFICE
CERTIFICATE OF CORRECTION

PATENT NO. : 7,616,841 B2 Page 1 of 1
APPLICATION NO. : 11/155870
DATED : November 10, 2009
INVENTOR(S) : M. Dirk Robinson and David G Stork It is certified that error appears in the above-identified patent and that said Letters Patent is hereby corrected as shown below:

Column 18, line 40, in Claim 32, replace "where v" with --where y--.

Signed and Sealed this

Second Day of February, 2010

David J. Kappos
*Director of the United States Patent and Trademark Office*